Dec. 16, 1930.  F. FLORIAN  1,784,832
TRACK SANDER FOR MOTOR VEHICLES
Filed Aug. 30, 1929    3 Sheets-Sheet 1

Inventor:
Frank Florian,
By Fisher, Clapp, Soans + Pond,
Attys

Dec. 16, 1930.    F. FLORIAN    1,784,832
TRACK SANDER FOR MOTOR VEHICLES
Filed Aug. 30, 1929    3 Sheets-Sheet 3

Inventor:
Frank Florian,
By Fisher, Clapp, Soans + Pond
Attys

Patented Dec. 16, 1930

1,784,832

UNITED STATES PATENT OFFICE

FRANK FLORIAN, OF CHICAGO, ILLINOIS

TRACK SANDER FOR MOTOR VEHICLES

Application filed August 30, 1929. Serial No. 389,365.

This invention relates to an improved track sander for automobiles and other motor vehicles and has for its principal object to provide a simple and efficient accessory for a motor vehicle which will overcome the slipping and skidding of the traction wheels on wet or slippery pavements, and thus eliminate or reduce the liability of personal injury and property damage which so frequently results from loss of control of the vehicle resulting from the slipping or skidding of the wheels on the roadway.

As is well known, manufacturers of automobiles and automobile accessories have heretofore endeavored to overcome skidding and slipping by the use of chains mounted on the wheels, a special type of so-called "non-skid" tire, and the use of 4-wheel brakes to increase the friction between the base of the wheels and the pavement; but the employment of any or all of such devices does not afford sufficient friction to reduce skidding and slipping to a minimum.

My present invention relates to an improved device, preferably power operated, for applying dry sand, or other friction compound, between the wheel base of the traction wheels and the pavement to create sufficient friction to reduce skidding and slipping to a minimum when applying brakes to stop on wet or slippery pavement, and also to create better traction to avoid spinning of the wheels when starting on wet or slippery pavements.

My invention, its mode of use, and the benefits and advantages resulting therefrom will be readily understood by persons skilled in the art from the following detailed description, taken in connection with the accompanying drawings wherein I have illustrated one practical embodiment of the invention, as applied to a passenger automobile, and in which—

Figure 3:
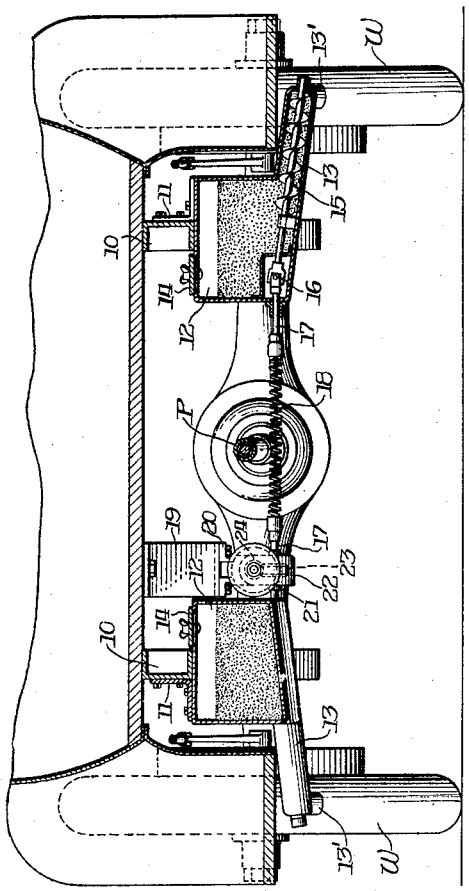
Fig. 3 is a transverse section substantially on the offset line 3—3 of Fig. 1.

Referring to the drawings, attached to the usual longitudinal frame bars 10 of the chassis, as by suitable angle brackets 11, are a pair of water-proof sand boxes 12, from the rear outer bottom corners of which extend delivery chutes 13 terminating in downwardly and rearwardly curved discharge nozzles 13' that, as clearly shown in Fig. 3, lie in the planes of the rear traction wheels W just to the front of the latter, whereby said nozzles are adapted to discharge sand onto the roadway directly in the path of the wheels W.

Figure 2:
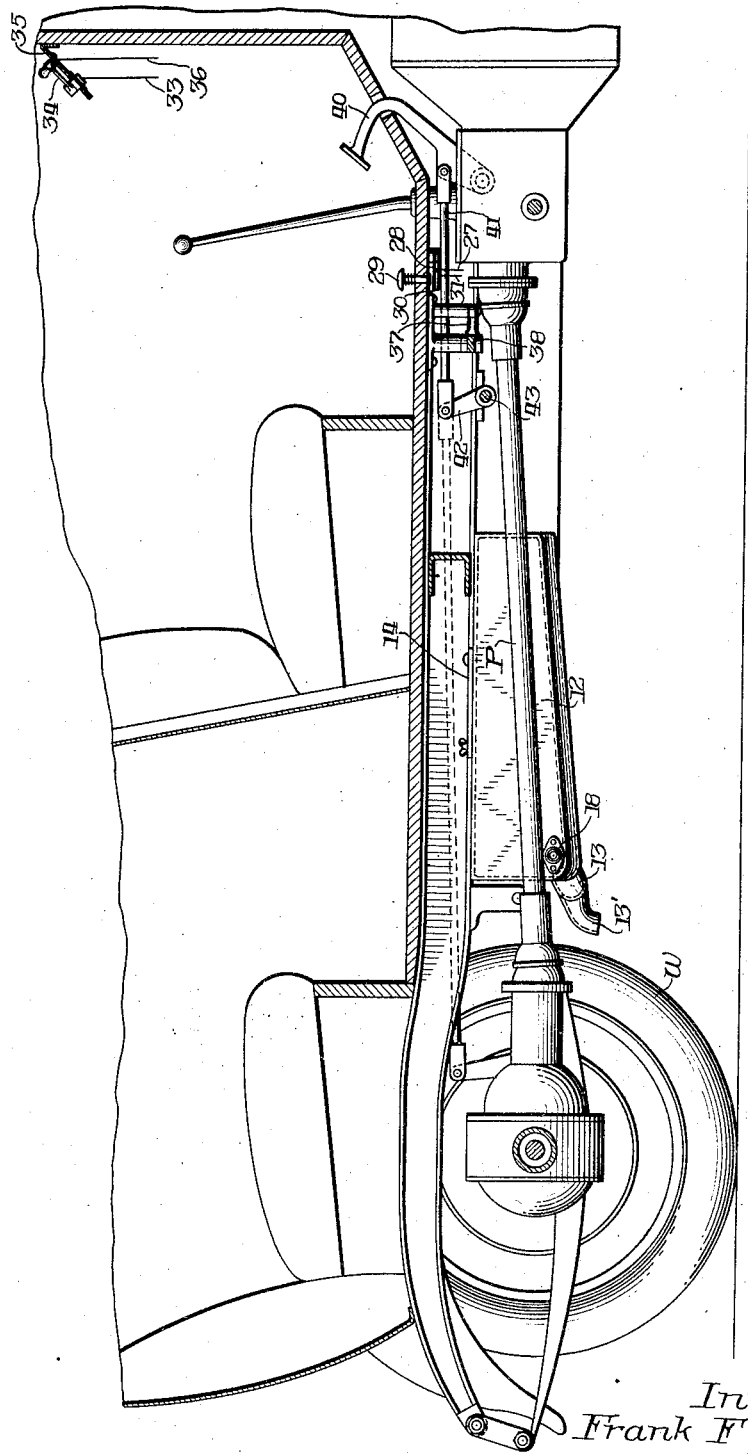
Fig. 2 is a vertical longitudinal section of the parts shown in Fig. 1.

It will be observed by reference to Fig. 2 that the bottom wall of each sand box is downwardly inclined from its front to its rear end, and, by reference to Fig. 3 it will also be seen that the bottom wall of the box slopes downwardly from its inner to its outer side, whereby the same tends to gravitate both lengthwise and crosswise of the box toward the discharge chute 13. The top wall of each box is formed with a filling opening covered by a removable lid 14.

Suitably journaled in each of the discharge chutes 13 is a mechanical sand mover preferably taking the form of a screw conveyor 15. The inner ends of the conveyor shafts are connected by universal joint couplings 16 to a pair of shaft sections 17 that are journaled in the inner side walls of the boxes 12, and the inner ends of the shaft sections 17 are connected by an intermediate flexible shaft section 18 which extends crosswise of the propeller shaft P. The main purpose of the flexible shaft section 18 is to prevent possible injury to the conveyor driving shaft in case the latter should strike the propeller shaft under the vertical jolting movements of the car body.

To the under side of the car body is attached a depending hanger bracket 19, to the bottom of which is bolted a ring-shaped saddle 20 (Figs. 1 and 3) supporting an electric motor 21, and attached to the same bracket 19 is a gear box 22 through which one of the shaft sections 17 extends. Said shaft section is equipped with a worm wheel 23 (Fig. 3) driven by a worm 24 fast on the shaft 25 of the electric motor 21.

Figure 1:
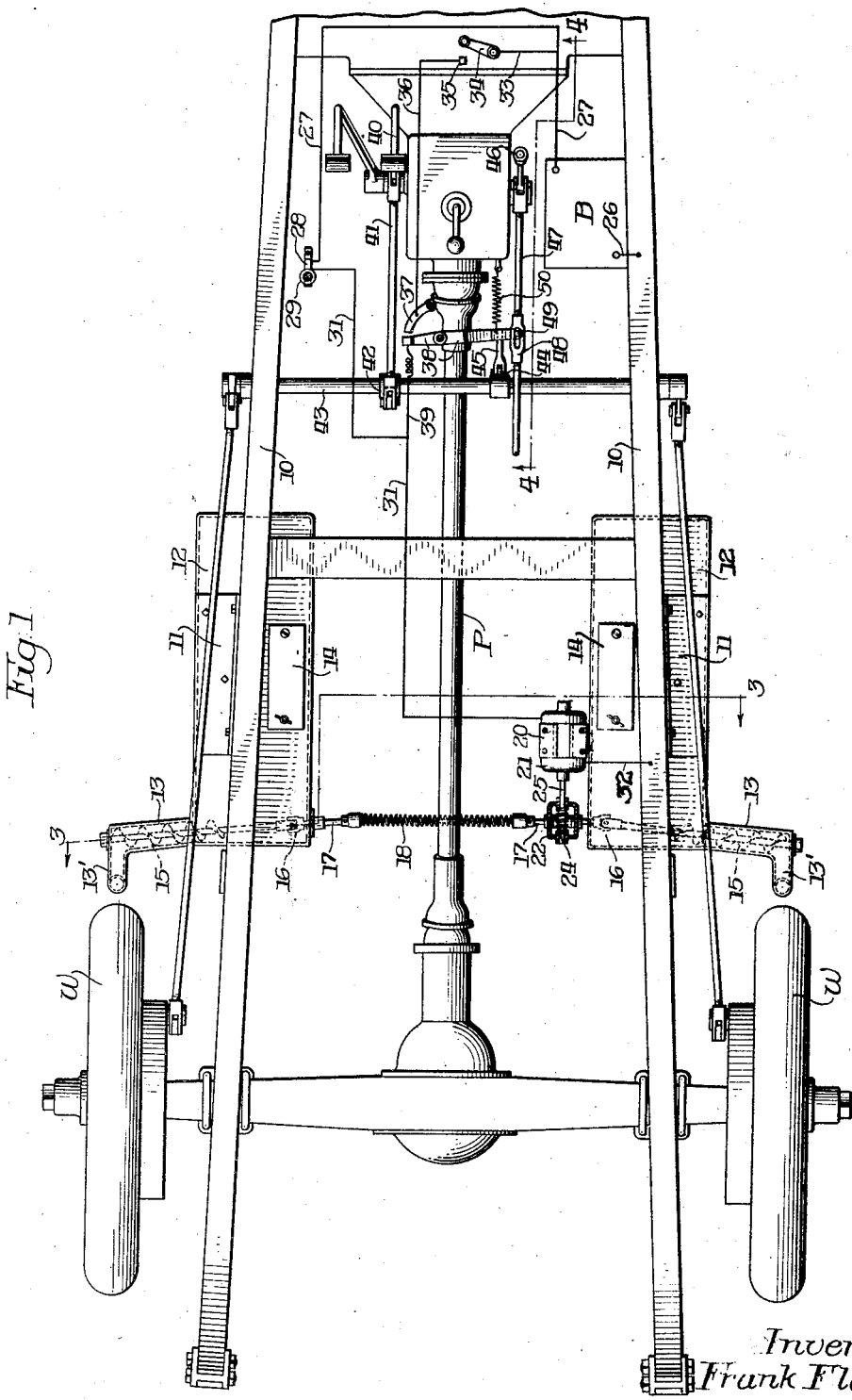
Fig. 1 is a top plan view of an automobile chassis with the front wheels omitted, showing my improved track sander applied thereto.

In the preferred embodiment of the invention herein illustrated, I provide a normally open pedal operated switch in the circuit of the motor 21, by which the motor may be energized by simply depressing said foot pedal, and I also provide a shunt circuit containing a normally open switch adapted to be closed by either the brake pedal lever or the emergency brake lever, and a normally open manually operable switch, which is first closed when either the pedal brake or the hand brake is to be applied when the car is travelling on a wet or slippery pavement. Referring to Fig. 1, B designates a battery or other source of current grounded on one side to the chassis frame as shown at 26. From the other pole of the battery a circuit line 27 extends to one leaf 28 of a normally open spring switch that is closed by a pedal-operated push button 29 (Fig. 2). The other leaf 30 of the switch is connected by a line wire 31 to one side of the motor 21, the other side of which is grounded at 32 to the chassis frame. If, while driving on a wet or slippery road, the traction wheels begin to slip or skid, the driver by simply depressing the pedal 29, can instantly close the motor circuit, start the motor in operation, and sand is then fed to the roadway just in advance of the traction wheels, so as to arrest the slipping or skidding movement of the latter. The sand feed can be maintained as long as necessary by simply maintaining the pedal-operated switch closed.

As is well known, many serious accidents occur through sudden or violent application of the brakes when the car is travelling on a slippery road. To meet this emergency, I provide a shunt circuit comprising, in the instance shown, a wire 33 leading from the wire 27 to the heel of a manually operable switch 34, preferably mounted on the instrument board of the car, a fixed contact 35 with which the switch 34 cooperates, a wire 36 leading from the contact 35 to a second fixed contact 37, a pivoted switch lever 38, and a wire 39 connecting the switch lever 38 with the line 31. 40 designates the usual pedal brake lever, to which, above its pivot, is connected a link 41 (Fig. 2), the rear end of said link being pivoted to an upstanding arm 42 fast on a rock shaft 43 journaled beneath and crosswise of the side frame members of the chassis. On the rock shaft 43 is a depending arm 44 (Fig. 4) that is connected by a link 45 to the inner end of the switch lever 38. When the driver seeks to arrest the travel of the car on a slippery road by the use of the foot lever 40, he first closes the switch 34, and then the manipulation of the pedal brake lever 40, through the mechanism last described, closes the circuit at 38, 37, thus instantly starting the flow of sand to the roadway in advance of the traction wheels and giving the latter a grip on the surface to prevent skidding.

Figure 4:
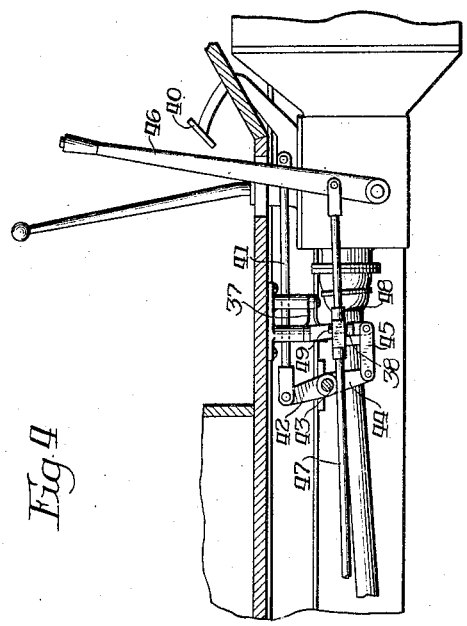
Fig. 4 is an enlarged vertical longitudinal section on the line 4—4 of Fig. 1.

Referring to Figs. 1 and 4, 46 designates the usual emergency hand lever, to which is connected, above its pivot, a rod 47 leading rearwardly to the brake applying mechanism. In the rod 47 is interposed a longitudinally slotted coupling member 48, through which extends an upstanding pin 49 on the inner end of the switch lever 38. When the hand lever 46 is drawn rearwardly to apply the brakes, the switch 38, 37 is closed, and, the manually operable switch 34, 35 having been previously closed, the feeding of sand is started simultaneously with the application of the emergency brake. The slot in the coupling member 48 permits the closing of the circuit by the pedal lever 40 when the emergency brake lever is in idle position; and the switch 38 is normally maintained open by a light pull spring 50.

From the foregoing it will be seen that my invention provides for the instant application of sand to the roadway at suitable points to be effective on the traction wheels under all emergency conditions which ordinarily arise. If the traction is poor with occasional slipping of either or both rear wheels, this may be corrected by simply depressing the pedal lever 29 by the foot until the slipping has ceased. If, on the other hand, when applying the brakes there is danger that the car may skid on account of a slippery pavement, the driver first simply snaps the switch 34 closed, and then manipulates either the pedal or the hand brake lever, and this instantly supplies the sand to the roadway. Of course, under normal application of the brakes on a dry roadway, with the motor circuit open at the switch 34, the use of either brake lever does not energize the motor, so that the sanding mechanism remains idle.

Manifestly, many changes in structural detail and arrangement of the described parts may be resorted to in installations of the device on different makes of automobiles and other motor vehicles, hence I do not limit the invention to the particular embodiment herein presented for purposes of illustration, but reserve all such variations, modifications and mechanical equivalents as fall within the spirit and purview of the claims.

I claim:

1. An improved track sander for motor vehicles of the character described and illustrated, in combination with a motor vehicle chassis, sand boxes mounted on said chassis, having discharge chutes extending outward and sloping downward to a point in front of the rear traction wheels of the motor vehicle thence downwardly and rearwardly, screw conveyors in said chutes, electric motor geared to said conveyors by means of flexible shaft and universal joints, a source of electrical current, a current line connecting said source to said motor, a normally open manually operated switch preferably mounted on the instrument board, a normally open switch adapted to be closed by either the emergency brake lever or brake pedal lever of the vehicle through which said second switch is closed when said emergency brake lever or pedal brake lever is actuated to apply the brakes, thus providing means of operating the said track sander to reduce skidding and slipping of said traction wheels when stopping said vehicle.

2. An improved track sander for motor vehicles of the character described and illustrated, in combination with a motor vehicle chassis, sand boxes mounted on said chassis, having chutes extending outward and sloping downward to a point in front of the rear traction wheels of the motor vehicle thence downwardly and rearwardly, screw conveyors in said chutes, electric motor geared to said conveyors by means of flexible shaft and universal joints, a source of electrical current, a current line connecting said source to said motor, a normally open foot pedal switch in the circuit of the motor, said foot pedal situated in floor board of the vehicle by which said motor may be energized by depressing said foot pedal thus operating said track sander to create better traction to avoid spinning of the traction wheels when starting or moving forward on wet or slippery pavements.

FRANK FLORIAN.